United States Patent [19]

Le Marchand et al.

[11] Patent Number: 4,595,085

[45] Date of Patent: Jun. 17, 1986

[54] DEVICE FOR ACTUATING A DISC BRAKE WITH AUTOMATIC ADJUSTMENT

[75] Inventors: Claude Le Marchand, Domont; Jean-Pierre Gautier, Aulnay/bois, both of France

[73] Assignee: Societe Anonyme D.B.A., Paris, France

[21] Appl. No.: 643,595

[22] Filed: Aug. 23, 1984

[30] Foreign Application Priority Data

Sep. 13, 1983 [FR] France ............... 83 14507

[51] Int. Cl.[4] .................................. F16D 65/56
[52] U.S. Cl. ..................... 188/71.9; 188/196 D; 188/196 F
[58] Field of Search ............ 188/71.7, 71.8, 71.9, 188/196 D, 196 V, 196 F

[56] References Cited

U.S. PATENT DOCUMENTS

| 3,378,109 | 4/1968 | Bauman | 188/71.9 |
| 4,167,989 | 9/1979 | Meyer | 188/71.9 |
| 4,323,143 | 4/1982 | Negishi | 188/71.9 |

FOREIGN PATENT DOCUMENTS

| 62567 | 10/1982 | European Pat. Off. | 188/71.8 |
| 1317919 | 1/1963 | France . | |

Primary Examiner—Duane A. Reger
Assistant Examiner—Richard R. Diefendorf
Attorney, Agent, or Firm—Larry J. Palguta; Ken C. Decker

[57] ABSTRACT

The device incorporates a tubular bearing component (20) having an end portion inserted into the bottom (11) of the piston (1) and a portion projecting into the cavity (9) of the piston, the uni-directional clutch-spring (14) for the tapped sleeve (12) engaged on the threaded rod (8) for the handbrake being mounted on this projecting portion of the bearing component and incorporating an end arm (15) joined to the sleeve (12).

4 Claims, 2 Drawing Figures

U.S. Patent   Jun. 17, 1986   4,595,085
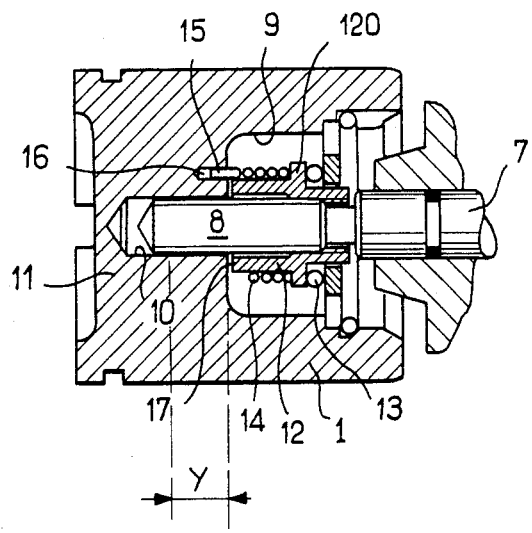
PRIOR ART
FIG_1
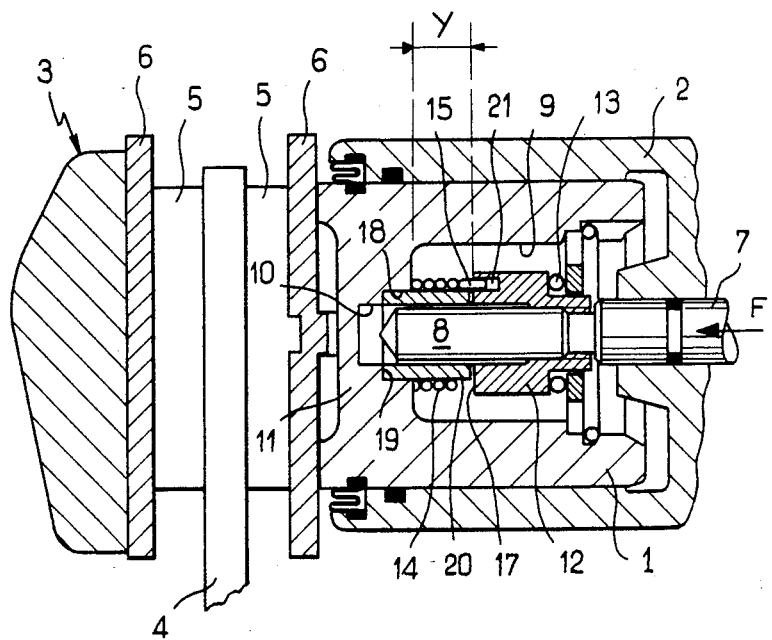
FIG_2

DEVICE FOR ACTUATING A DISC BRAKE WITH AUTOMATIC ADJUSTMENT

The present invention related to improvements in devices for actuating a disc brake with automatic taking up of the play resulting from the wear of the friction linings, forming the subject of French Patent No. 1,317,919 in the name of the Applicant Company, whose contents is assumed to be incorporated herein for reference.

The actuating device with automatic taking up of play described in the document essentially incorporates, as shown in FIG. 1 of the attached drawings, a brake actuator piston 1 intended to be mounted in a cylinder 2 of a caliper structure 3 (FIG. 2) sliding relative to a fixed brake support so as to apply selectively, against the opposite surfaces of a disc 4, friction linings 5 mounted on lining support plates 6. The actuating device also incorporates a rod 7, which can be actuated by a handbrake or parking mechanism, incorporating a threaded end portion 8 extending axially into an inner cavity 9 of the piston 1 up to and into bore 10 formed in the bottom wall of the piston 1 defining the inner cavity 9 in the direction of the disc 4. A tapped sleeve 12 is engaged on the threaded end 8 of the rod 7, capable of moving axially with the piston 1 by means of a thrust ball race system 13 cooperating with a collar 120 of the sleeve 12. The periphery of the front end (opposite to the thrust ball race 13) of the sleeve 12 is precision machined to permit the fitted mounting of a helical spring 14 forming a uni-directional clutch and incorporating an end portion folded in an axial direction 15 and engaged in a blind hole 16 formed in the bottom wall 11 of the piston 1. In this way, the spring 14 allows the sleeve 12 to rotate, relative to the threaded rod 8 and to the piston 1, only in the direction corresponding to the displacement of the sleeve towards the bottom 11 of the piston (the piston 1 being prevented from turning relative to the cylinder 2, by cooperation with the support plate 6 of the adjacent friction lining 5, for example, the rod 7-8 also being prevented from turning by means of a stud, for example, on its outer end, cooperating with a groove in the actuating cam system of the handbrake mechanism).

This system, widely proven, gives every satisfaction with a piston 1 made of steel and thus having sufficient mechanical strength in the bearing zone opposite the frontal bearing end 17 of the sleeve 12 to withstand the thrust force F (FIG. 2) of the handbrake mechanism on the rod 7-8. Because the present trend in the motor industry is to reduce weight as much as possible, particularly of ancilliary equipment, disc brakes use brake actuator pistons 1 more and more frequently made of light alloy, for example extruded aluminium alloy. Problems then arise of mechanical behavior of the bearing zone of the bottom wall 11 of the piston facing the frontal end 17 of the sleeve 12, and also in the region of the housing 16 for the end which is folded in an axial direction 15 of the clutch-spring 14.

The document EU-A-No. 0,062,567 proposed the interposition, between the tapped sleeve and the bottom of the piston, of a thick washer made of hard material inserted into a housing formed in the bottom wall of the piston. The document does not propose however, any modifications to the system for automatic taking up of play as described in relation to FIG. 1 of the present application and to FIG. 1 of the said document.

The aim of the present invention is to propose a device for actuating a disc brake with automatic taking up of play, of simple and robust design, of low cost of manufacture and assembly, suitable for a piston made of light alloy and permitting a significant reduction of the weight of the unit.

For this purpose, in accordance with a characteristic of the present invention, the device for actuating a disc brake with automatic taking up of play resulting from the wear of friction linings, of the type incorporating a hollow piston defining an inner cavity with a bottom, a threaded rod for the handbrake extending into the piston cavity, a tapped sleeve engaged on the threaded rod and movable with the piston during actuation of the latter, the sleeve incorporating an annular frontal bearing surface, a helical spring forming a unidirectional clutch joined to the tapped sleeve allowing it to rotate relative to the threaded rod and to the piston only in the direction corresponding to the displacement of the sleeve towards the bottom of the piston, and a tubular bearing component interposed between the frontal bearing surface of the sleeve and the bottom of the piston, in which it is housed, is characterized in that the tubular bearing component is cylindrical and incoporates an end portion inserted into the bottom of the piston and a portion projecting into the piston cavity, the spring being mounted on this projecting portion and incorporating an end arm joined to the sleeve.

With such an arrangement, the tubular bearing component, or insert, being inserted with a tight fit into the bottom of the piston, has for this purpose an outside diameter machined to a close tolerance with a good surface finish. Mounting the clutch-spring on this tubular bearing component, which already has the correct finish, avoids having to grind the tapped sleeve and thus permits an appreciable reduction in cost. In addition, mounting the spring on the tubular bearing component enables the thickness of the bottom of the piston to be considerably reduced, thus assisting in achieving a lighter device for actuating a disc brake.

Other characteristics and advantages of the present invention will emerge from the following description of an embodiment, with reference to the accompanying drawings, in which:

FIG. 1 shows diagrammatically a device for actuating a disc brake from the prior art, such as has just been described; and FIG. 2 shows, also in longitudinal section, an actuating device according to the invention.

In FIGS. 1 and 2, identical or similar components carry the same reference numbers, so as to avoid the need to refer back to the general arrangement of the device of the invention as shown in FIG. 2. As may be seen in this FIG. 2, the device of the invention differs essentially from the device from the prior art shown in FIG. 1 in that the blind bore 10 at the bottom 11 of the piston 1 incorporates a coaxial entrance portion of enlarged diameter 18, thus defining with the bore 10 a radial shoulder 19, in which is inserted with a tight fit a tubular insert 20 precision machined on its outside and made of a hard material, for example of steel or of the proprietary composition sold under the name Zicral. The insert 20 thus incorporates a portion inserted into the bottom 11 of the piston 1 and a free portion projecting into the cavity 9 up to and opposite the frontal bearing surface 17 of the tapped sleeve 12. In accordance with the invention, the tapped sleeve 12 has an outside diameter slightly enlarged, corresponding to that of the collar 120 of the embodiment from the prior art, so that the frontal bearing surface 17 extends radially outwards relative to the insert 20. In this frontal surface 17 an axial blind hole 21 is arranged, in which is inserted the end which is folded in an axial direction 15 of the helical clutch-spring 14 mounted with a close sliding fit on the periphery of the insert 14. The operation of the device according to the invention is identical in all respects to that previously described. In addition, as may be established by a comparison of FIGS. 1 and 2, the fact that the spring is arranged on a projecting portion of the insert 20 enables the thickness of the bottom 11 of the piston 1 to be reduced by an axial distance Y and thus to save material in proportion to the diameter of the inner cavity 9 of the piston 1 (which diameter may also be increased relative to that shown in FIG. 2).

We claim:

1. A device for actuating a disc brake with automatic taking-up of play resulting from wear of friction linings, incorporating:

a hollow piston defining an inner cavity with a bottom;

a mechanically actuatable threaded rod extending coaxially into the cavity of said piston;

a tapped sleeve threadably engaged on said threaded rod and movable with the piston during actuation of the piston, said sleeve having an annular frontal bearing surface;

a helical clutch-spring forming a uni-directional clutch operatively coupled to said tapped sleeve and allowing said sleeve to rotate relative to the threaded rod and piston only in a direction corresponding to displacement of said sleeve toward the bottom of said piston; and a cylindrical bearing member interposed between said frontal bearing surface of said sleeve and the bottom of said piston, said cylindrical bearing member having an end portion force-fitted into the bottom of said piston and a projecting portion extending into the cavity of said piston, said helical clutch-spring mounted on said projecting portion and comprising an end arm connected to said sleeve.

2. The device according to claim 1, characterized in that the end arm of the spring is folded in an axial direction and is engaged in a blind hole formed in the frontal bearing surface of the sleeve.

3. The device according to claim 1, characterized in that the piston is made of light alloy.

4. A disc brake having a caliper sliding relative to a fixed support and housing an actuating device with automatic taking-up of play, said actuating device including:

a hollow piston defining an inner cavity with a bottom;

a mechanically actuatable threaded rod extending coaxially into the cavity of said piston;

a tapped sleeve threadably engaged on said threaded rod and movable with the piston during actuation of the piston, said sleeve having an annular frontal bearing surface;

a helical clutch-spring forming a uni-directional clutch operatively coupled to said tapped sleeve and allowing said sleeve to rotate relative to the threaded rod and piston only in a direction corresponding to displacement of said sleeve toward the bottom of said piston; and a cylindrical bearing member interposed between said frontal bearing surface of said sleeve and the bottom of said piston, said cylindrical bearing member having an end portion force-fitted into the bottom of said piston and a projecting portion extending into the cavity of said piston, said helical clutch-spring mounted on said projecting portion and comprising an end arm connected to said sleeve.

* * * * *